Figure 1:
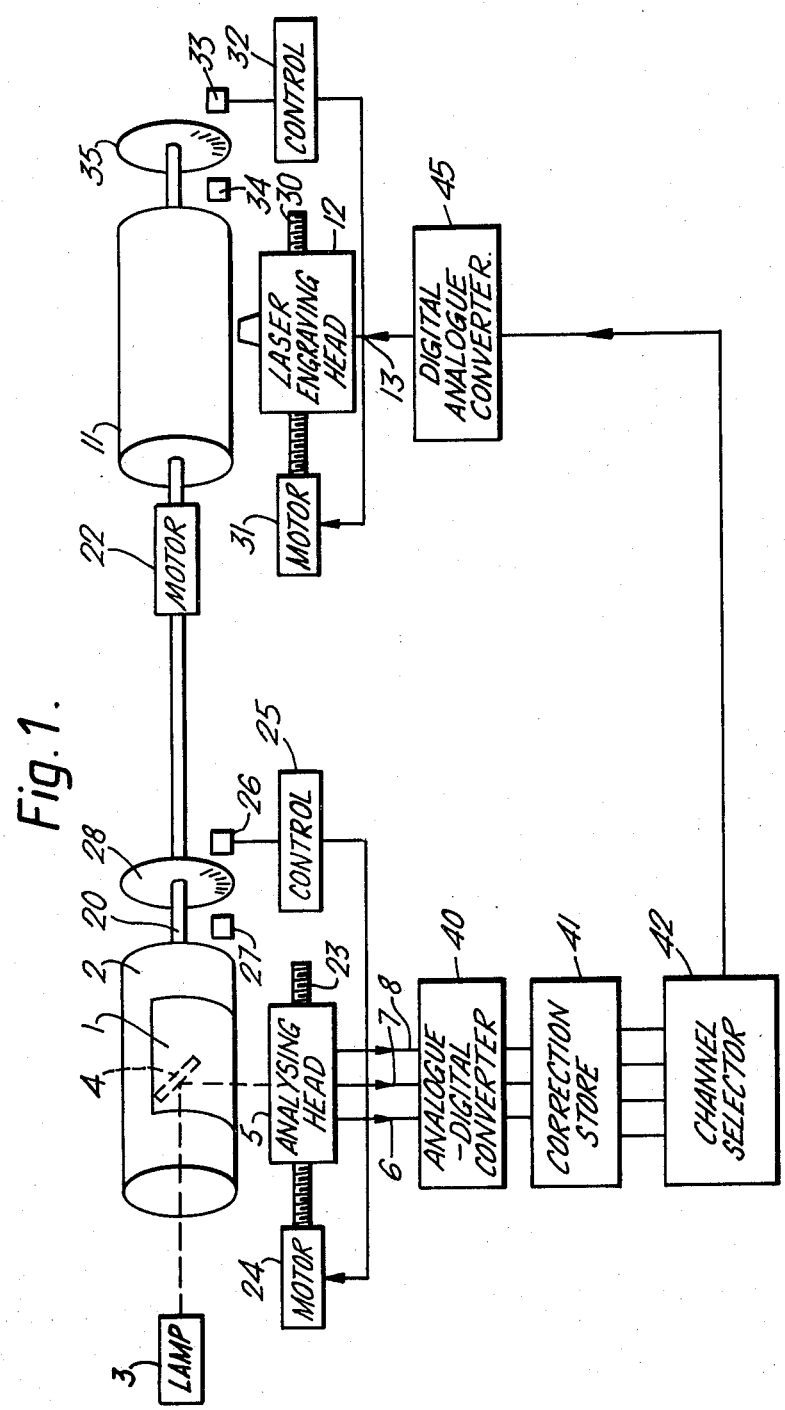

United States Patent [19]

Chase et al.

[11] 4,347,785

[45] Sep. 7, 1982

[54] ENGRAVING PRINTING CYLINDERS

[75] Inventors: Bryan B. Chase, Layer-de-la-Haye; Alberto Yi, London, both of England

[73] Assignee: Crosfield Electronics Limited, London, England

[21] Appl. No.: 127,431

[22] Filed: Mar. 5, 1980

[30] Foreign Application Priority Data

Mar. 7, 1979 [GB] United Kingdom ............... 7908041

[51] Int. Cl.³ .............................................. B23K 9/00
[52] U.S. Cl. .................... 101/1; 219/121 L; 219/121 FS; 346/76 L
[58] Field of Search .............. 101/1 R, 426, 150, 170; 346/76 L; 219/121 L, 121 LA, 121 LB, 121 FS, 121 LH, 121 LS, 121 LY, 121 LG, 121 LF, 121 LM; 430/307, 363, 945; 330/4.3; 332/7.51; 178/4, 4.1 R, 36

[56] References Cited

U.S. PATENT DOCUMENTS

| | | | |
|---|---|---|---|
| 3,388,314 | 6/1968 | Gould | 219/121 L |
| 3,626,141 | 12/1971 | Daly | 219/121 FS |
| 3,636,251 | 1/1972 | Daly et al. | 219/121 LB |
| 3,696,230 | 10/1972 | Friedrich | 219/121 FS X |
| 3,866,398 | 2/1975 | Vernon, Jr. et al. | 219/121 FS |
| 4,015,221 | 3/1977 | Dalton | 219/121 LA |
| 4,027,137 | 5/1977 | Liedtke | 219/121 L |
| 4,087,672 | 5/1978 | Yi | 346/76 L |
| 4,121,085 | 10/1978 | Diemer et al. | 219/121 FS |
| 4,149,062 | 4/1979 | Limmer et al. | 219/121 FS |
| 4,170,726 | 10/1979 | Okuda | 219/121 L X |

FOREIGN PATENT DOCUMENTS

| | | | |
|---|---|---|---|
| 1035342 | 7/1966 | United Kingdom | 346/76 L |
| 1410344 | 10/1975 | United Kingdom | 346/76 L |

OTHER PUBLICATIONS

"Particle Collector" Gates et al., IBM Tech. Discl. Bulletin, vol. 17, No. 9, Feb. 1975, p. 2589.

Primary Examiner—E. H. Eickholt
Attorney, Agent, or Firm—Kemon & Estabrook

[57] ABSTRACT

Apparatus for engraving a rotating cylinder by means of a laser, in which the laser beam is focused onto a small area of the cylinder surface by a lens, including means for defining a path for the flow of compressed air across the path of the laser beam, and a suction device communicating with the region between the lens and the cylinder for extracting air from this region, the flow of air serving to remove debris from the area being engraved and to prevent it from reaching the lens.

5 Claims, 2 Drawing Figures

ENGRAVING PRINTING CYLINDERS

This invention relates to apparatus for engraving a rotating cylinder by means of a laser beam, for example for the purpose of forming a printing cylinder.

When a cylinder is subjected to the action of a laser beam, plasma and debris from the cylinder are produced adjacent the cylinder surface. It is known in laser machining of workpieces to remove such debris from the point of incidence of the laser beam and the workpiece by directing an air blast at this point, as shown in FIG. 18 of U.S. Pat. No. 3,388,314.

In the laser engraving of a printing cylinder, the depth of the engraving may be very small and consequently it is particularly important to remove the debris from the region in which the laser beam is incident on the cylinder surface. It is also important to remove the debris from the region of the lens to prevent the formation of a deposit on the lens surface, which would cause a deterioration in beam quality.

According to the present invention, apparatus for engraving a rotating cylinder by means of a laser comprises: a lens mounted for focusing the laser beam substantially at the cylinder surface, and means defining a path, spaced from the cylinder surface, for a flow of air between the lens and the cylinder, the said path-defining means comprising an air channel, for connection to an air supply, having an exit arranged to direct air across the beam path obliquely away from the lens axis, and suction means communicating with the region between the lens and the cylinder for extracting air from the region between the lens and the cylinder.

Such apparatus provides an air screen or curtain preventing the ingress of debris to the lens housing and effectively isolating the lens from contamination, as well as removing the debris; additionally, this is effected without directing the air flow on to the cylinder surface, which might result in excessive cooling of the surface and might affect the depth of the engraved lines.

In the preferred form, the air channel is provided by a passage in a member located between the lens and the cylinder, the passage extending from the external wall of the member to a central bore through which the laser beam passes. Between this member and the cylinder is a suction chamber having an end surface curved to have a uniform spacing from the cylinder. The suction chamber is preferably mounted for axial sliding motion with respect to the lens, and preferably the member containing the air passage is so formed that the suction chamber slides towards the cylinder as a result of the air pressure when the engraving operation commences.

The air passage and suction means assist in defining the path of the air flow; the suction chamber assists in protecting the cylinder in the vicinity of the engraving head, from turbulent air flow resulting from cylinder slip-stream. This too helps to prevent excessive cooling of the cylinder surface.

Figure 2:
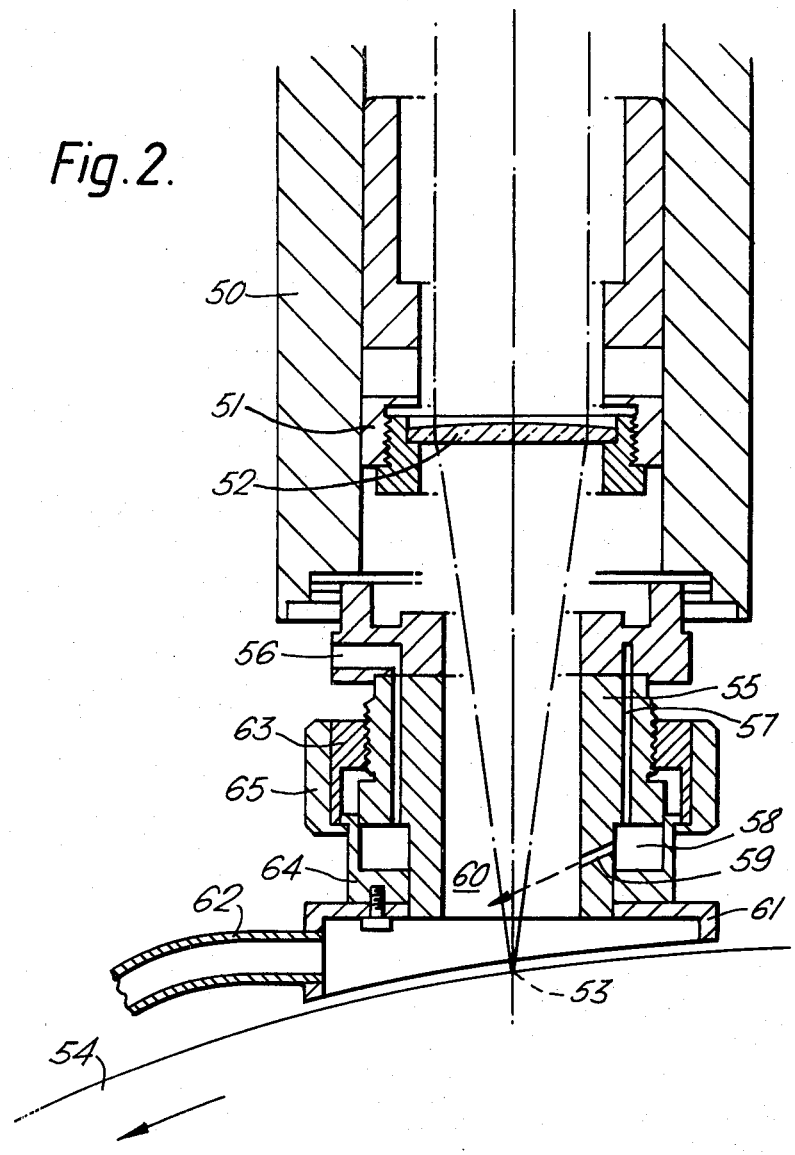

In order that the invention may be better understood, an example of apparatus embodying the invention will now be described with reference to the accompanying drawings, in which:

FIG. 1 illustrates a form of scanner to which the present invention can be applied; and FIG. 2 illustrates the end of the exposing head close to the cylinder, in side elevation and in section.

In FIG. 1, a transparency 1 to be copied is wrapped around a transparent cylinder 2 and is illuminated with light from a lamp 3 after reflection by a mirror 4 on the axis of the cylinder. The reflected light passes through the transparency to a photo-electric analysing head 5 which provides on lines 6, 7 and 8 signals representing the colour-component values of the element of the transparency through which the light beam passes.

A cylinder 11 to be engraved is subjected to the action of a coherent light beam from a laser in an engraving head 12, controlled by a signal on line 13.

In this example, the cylinders 2 and 11 are mounted on a common shaft 20 driven by a motor 22. A lead screw 23, on which the analysing head 5 is mounted, is driven by a motor 24, the rotation of which is governed by a control unit 25 receiving signals from a photodetector 26. The photodetector receives light from a source 27 through a slotted disc 28. In a similar manner, the engraving head 12 is mounted on a lead screw 30 driven by a motor 31 the rotation of which is governed by a control unit 32 with the aid of a photocell 33, a light source 34 and a slotted disc 35.

In this way, the analysing and engraving heads are made to move along their lead screws as the cylinders rotate at a high speed. As a consequence each head scans its cylinder in a helical line.

The colour-component signals on lines 6, 7 and 8 are converted to digital form in an analogue-digital converter 40 and are applied to a colour correction unit 41 constituted by a look-up store. This store is loaded with a matrix of corrected values corresponding to the possible combinations of input values from the A-D converter 40. The input values represents addresses in the look-up table 41, at which the corrected values are to be found. A channel selector 42 selects the corrected values for one colour component (on the assumption that a single separation is being made at any time); this may be, for example the cyan component. These values are applied through a digital-analogue converter 45 to provide on line 13 an analogue signal for modulating the laser in the engraving head.

Turning now to FIG. 2, the engraving head terminates in a tubular member 50 into which is fitted a lens housing 51 carrying a lens 52. The laser beam passes axially down the tube 50 and through the lens, which focuses the beam to a spot 53 on or close to the surface of a cylinder 54.

Between the lens housing 51 and the cylinder there is provided a member 55 having a central bore 60 coaxial with the lens housing 51. The member 55 is formed with an air inlet 56, for connection to a source of compressed air, leading into six equally-spaced channels 57, formed parallel to the bore 60. The channels 57 lead into an annular air chamber 58 from which the air escapes through a passage 59 into the bore 60, along an oblique path indicated by the dotted arrow, Bolted to the end of the member 64 forming the annular air chamber 58, is a cover 61 constituting an open-ended suction chamber. A suction pipe 62 is connected to a vaccum source (not shown). The effect of the obliquely directed air flow and the suction means is to cause the air to extract plasma and debris from the region of the cylinder surface without excessive cooling of the surface.

In the form illustrated, the member 64 to which the suction chamber is bolted, is mounted for sliding motion on the member 55. It is prevented from travelling too close to the cylinder 54 by the interaction of lips on member 64 and a knurled ring 65, which is rigidly attached to member 63. With this arrangement, when the engraving head is not in operation the suction chamber can be raised, relative to the lens (thereby closing up the annular air chamber 58) to space the suction chamber from the cylinder surface so as to permit this surface to be inspected. As soon as the air supply is switched on, the air pressure forces the annular chamber 58 to expand and thus pushes the suction chamber 61 to the limit of its range of movement towards the cylinder surface. This limit may be adjusted by rotating the member 63 by means of the knurled ring 65.

It will be appreciated that the apparatus shown in FIG. 1 is an example of many forms of scanner to which the invention may be applied; for example, the scanner may comprise independently mounted analysing and engraving cylinders and the data derived from the analysing cylinder may be stored, for example in an intermediate disc store, before being used for engraving. Also, it can be arranged that the extraction of data from the store takes place at a rate so related to the speed of rotation of the engraving cylinder, and to the movement of the engraving head, that the resulting engraved image is enlarged or reduced with respect to the original on the analysing scanner. Also, in practice an interpolator would be used with the look-up table 41.

In a typical example, the cells or tracks engraved on the cylinder 11 by the laser have a depth of from a few microns to about 50 microns.

We claim:

1. Apparatus for engraving a cylinder by means of a laser, comprising:
   means for rotating the cylinder to be engraved;
   a lens mounted for focusing the laser beam substantially at the cylinder surface;
   a structure through which the beam emerges and which terminates in a chamber having one face open towards the rotating cylinder, the said structure including tubular means extending around the beam, the said chamber being shallow, in the direction of the laser beam, and wider than the tubular means, and having a lateral wall which extends around the beam but is spaced from the beam, the chamber being mounted to provide clearance between the cylinder and the edge of the lateral wall defining the open face;
   and means defining a path spaced from the cylindrical surface, for a flow of air between the lens and the cylinder, the said air path defining means comprising an air channel, for connection to an air supply, passing through the wall of the tubular structure and having an exit arranged to direct air into the shallow chamber along a path which crosses the optical axis of the lens obliquely in a direction away from the lens axis and is spaced from the point of incidence of the beam on the cylindrical surface, and suction means communicating with the said chamber for extracting air from the region between the lens and the cylinder.

2. Apparatus for engraving a cylinder by means of a laser, comprising:
   means for rotating the cylinder to be engraved;
   a lens mounted for focusing the laser beam substantially at the cylinder surface;
   a structure through which the beam emerges and which terminates in a chamber having one face open towards the rotating cylinder, the chamber having a lateral wall which extends around the beam but is spaced from the beam and being mounted to provide clearance between the cylinder and the edge of the lateral wall defining the open face, the edge of the lateral wall defining the open face of the chamber being shaped to conform with the cylinder contour;
   and means defining a path spaced from the cylindrical surface, for a flow of air between the lens and the cylinder, the said air-path defining means comprising an air channel, for connection to an air supply, having an exit arranged to direct air along a path which crosses the beam obliquely in a direction away from the lens axis and is spaced from the point of incidence of the beam on the cylindrical surface, and suction means communicating with the said chamber for extracting air from the region between the lens and the cylinder.

3. Apparatus for engraving a cylinder by means of a laser, comprising:
   means for rotating the cylinder to be engraved;
   a lens mounted for focusing the laser beam substantially at the cylinder surface;
   a structure comprising a member having a bore through which the laser beam passes and which terminates in a chamber having one face, through which the beam emerges, open towards the rotating cylinder, the chamber having a lateral wall which extends around the beam but is spaced from the beam and being mounted to provide clearance between the cylinder and the edge of the lateral wall defining the open face;
   and means for defining a path spaced from the cylindrical surface, for a flow of air between the lens and the cylinder, the said air-path defining means including an air inlet provided in the member through which the laser beam passes, for connection to a source of air under pressure, the air inlet leading to one or more channels which extend parallel to the bore and which open into an annular chamber from which an air passage extends through a wall portion of the member into the said bore, the air passage having an exit arranged to direct air along a path which crosses the beam obliquely in a direction away from the lens axis and is spaced from the point of incidence of the beam on the cylindrical surface, and suction means communicating with the said chamber for extracting air from the region between the lens and the cylinder.

4. Apparatus in accordance with claim 3, in which the annular chamber is formed by a ring-shaped member coaxial with and surrounding the said chamber, movable relative to the said member in the axial direction, and attached to the open-ended chamber, whereby the open-ended chamber is capable of sliding movement relative to the lens and is displaced towards the cylinder when air under pressure is supplied to the said air inlet.

5. Apparatus for engraving a cylinder by means of a laser, comprising:
   means for rotating the cylinder to be engraved;
   a lens mounted for focusing the laser beam substantially at the cylinder surface;
   a structure through which the beam emerges and which terminates in a chamber having one face open towards the rotating cylinder, the chamber having a lateral wall which extends around the beam but is spaced from the beam and being mounted to provide clearance between the cylinder and the edge of the lateral wall defining the open face;
   means defining a path spaced from the cylindrical surface, for a flow of air between the lens and the cylinder, the said air-path defining means comprising an air channel, for connection to an air supply, having an exit arranged to direct air along a path which crosses the beam obliquely in a direction away from the lens axis and is spaced from the point of incidence of the beam on the cylindrical surface, and suction means communicating with the said chamber for extracting air from the region between the lens and the cylinder;

and in which the optical axis of the lens is offset with respect to the axis of the cylinder whereby the laser beam is incident on the cylinder in a non-radial direction.

* * * * *